US011075897B2

(12) United States Patent
Weedermann

(10) Patent No.: US 11,075,897 B2
(45) Date of Patent: Jul. 27, 2021

(54) SYSTEM AND METHOD FOR COMMUNICATING WITH A SERVICE PROCESSOR

(71) Applicant: AVOCENT HUNTSVILLE, LLC, Huntsville, AL (US)

(72) Inventor: Joerg Weedermann, Santa Clara, CA (US)

(73) Assignee: Vertiv IT Systems, Inc., Huntsville, AL (US)

(*) Notice: Subject to any disclaimer, the term of this patent is extended or adjusted under 35 U.S.C. 154(b) by 182 days.

(21) Appl. No.: 16/119,484

(22) Filed: Aug. 31, 2018

(65) Prior Publication Data

US 2019/0124074 A1   Apr. 25, 2019

Related U.S. Application Data

(60) Provisional application No. 62/574,990, filed on Oct. 20, 2017.

(51) Int. Cl.
*H04L 29/06* (2006.01)
*H04L 29/08* (2006.01)
*H04L 12/24* (2006.01)

(52) U.S. Cl.
CPC .......... *H04L 63/0823* (2013.01); *H04L 41/28* (2013.01); *H04L 63/0869* (2013.01); *H04L 63/166* (2013.01); *H04L 63/168* (2013.01); *H04L 67/16* (2013.01); *H04L 67/42* (2013.01); *H04L 41/12* (2013.01); *H04L 41/20* (2013.01)

(58) Field of Classification Search
CPC ............ H04L 63/0823; H04L 63/0869; H04L 63/166; H04L 63/168; H04L 41/28; H04L 41/12; H04L 41/20; H04L 67/16; H04L 67/42
See application file for complete search history.

(56) References Cited

U.S. PATENT DOCUMENTS

| 6,456,306 B1 | 9/2002 | Chin et al. |
| 6,636,929 B1 | 10/2003 | Frantz |

(Continued)

FOREIGN PATENT DOCUMENTS

| CN | 101207516 A | 6/2008 |
| CN | 101826993 A | 9/2010 |
| CN | 102364444 A | 2/2012 |

OTHER PUBLICATIONS

International Search Report and Written Opinion issued in corresponding International Application No. PCT/US2018/053698 dated Feb. 1, 2019, 11 pp.

(Continued)

*Primary Examiner* — Hee K Song
(74) *Attorney, Agent, or Firm* — Harness, Dickey & Pierce, P.L.C.

(57) ABSTRACT

The present disclosure relates to a method for using a service processor to communicate with a remote component. The method may involve using the service processor of the device to discover a remote component connected to the device by a network. Once the remote component is discovered, the method may further involve using the service processor to establish a communications channel, using the network, with the remote device. The method may also involve using the service processor of the device to authenticate the remote component.

20 Claims, 2 Drawing Sheets

(56) References Cited

U.S. PATENT DOCUMENTS

| | | | |
|---|---|---|---|
| 7,237,267 B2 | 6/2007 | Rayes | |
| 7,466,713 B2 | 12/2008 | Saito | |
| 7,847,675 B1 | 12/2010 | Thyen | |
| 7,899,090 B2 | 3/2011 | Mittapalli et al. | |
| 8,090,819 B1 | 1/2012 | Ramamurthy | |
| 8,154,398 B2 | 4/2012 | Rolf | |
| 8,364,833 B2 | 1/2013 | Bennett | |
| 8,407,765 B2 | 3/2013 | Wiley | |
| 9,094,407 B1* | 7/2015 | Matthieu | H04W 4/70 |
| 9,537,879 B2 | 1/2017 | Blackwell | |
| 9,553,776 B2 | 1/2017 | Geffin | |
| 2002/0044663 A1 | 4/2002 | King | |
| 2002/0091869 A1 | 7/2002 | Jones | |
| 2004/0030413 A1 | 2/2004 | King | |
| 2005/0129035 A1 | 6/2005 | Saito | |
| 2005/0135271 A1* | 6/2005 | Inoue | H04L 9/0844 370/254 |
| 2005/0188193 A1 | 8/2005 | Kuehnel et al. | |
| 2006/0235650 A1 | 10/2006 | Vinberg et al. | |
| 2006/0259809 A1 | 11/2006 | Mishra | |
| 2007/0124474 A1 | 5/2007 | Margulis | |
| 2007/0152058 A1 | 7/2007 | Yeakley | |
| 2007/0168498 A1 | 7/2007 | Lambert | |
| 2007/0180522 A1 | 8/2007 | Bagnall | |
| 2008/0288704 A1 | 11/2008 | Diab | |
| 2008/0316024 A1 | 12/2008 | Chantelou | |
| 2008/0320136 A1 | 12/2008 | Holt et al. | |
| 2009/0006859 A1 | 1/2009 | Zimmer | |
| 2009/0307702 A1 | 12/2009 | Watkins | |
| 2010/0011178 A1 | 1/2010 | Feathergill | |
| 2010/0014526 A1 | 1/2010 | Chavan et al. | |
| 2010/0058335 A1 | 3/2010 | Weber | |
| 2010/0122120 A1 | 5/2010 | Lin | |
| 2010/0180284 A1 | 7/2010 | Ross | |
| 2011/0026080 A1 | 2/2011 | Onishi | |
| 2011/0179203 A1 | 7/2011 | Galloway | |
| 2011/0225446 A1 | 9/2011 | Lindeman | |
| 2012/0124375 A1* | 5/2012 | Truskovsky | H04L 63/0823 713/168 |
| 2012/0169458 A1 | 7/2012 | Dubois, Jr. | |
| 2016/0134710 A1 | 5/2016 | Ryu | |
| 2016/0205097 A1 | 7/2016 | Yacoub et al. | |
| 2016/0373431 A1* | 12/2016 | Van Den Broeck | H04L 63/06 |
| 2017/0026187 A1* | 1/2017 | Ramatchandirane | H04L 63/0876 |
| 2017/0118249 A1* | 4/2017 | Motukuru | H04L 12/4641 |
| 2018/0278607 A1* | 9/2018 | Loladia | H04L 63/0876 |
| 2020/0050753 A1* | 2/2020 | Davis | G01R 19/2513 |
| 2020/0153789 A1* | 5/2020 | Nalluri | H04L 67/34 |

OTHER PUBLICATIONS

Amiruddin Bin Husin, "A Study on Effectiveness of Network Monitoring System Software in Local Area Network Environment", 2008, Retrieved from http://library.utem.edu.my/index2.php?option=com.sub.--docman&task=doc.su- b.--view&gid=3351&Itemid1113, pp. 10-13.

Togan Mihai et al: "A smart-phone based privacy-preserving security framework for IoT devices", 2017 9th International Conference on Electronics, Computers and Artificial Intelligence (ECAI), IEEE, Jun. 29, 2017 (Jun. 29, 2017), pp. 1-7, [XP033276862].

European Search Report regarding EP 18867400.6, dated Apr. 7, 2021.

* cited by examiner

SYSTEM AND METHOD FOR COMMUNICATING WITH A SERVICE PROCESSOR

CROSS-REFERENCE TO RELATED APPLICATIONS

This application claims the benefit of U.S. Provisional Application No. 62/574,990, filed on Oct. 20, 2017. The entire disclosure of the above application is incorporated herein by reference.

FIELD

The present disclosure relates to systems and methods for communicating with service processors used in data center devices such as servers, power distribution units (PDUs), computer room air conditioning (CRAC) units, etc., and more particularly to a system and method for communicating with such devices where the service processor acts as a client that initiates communications with a management console.

BACKGROUND

The statements in this section merely provide background information related to the present disclosure and may not constitute prior art.

Managing a modern day data center often requires communication with small, embedded electronic controller devices that reside inside data center hardware Internet/computing ("IT") equipment and data center infrastructure equipment such as computer room air conditioning (CRAC) units, power distribution units (PDUs), uninterruptible power supply (UPS) systems, etc. The small, embedded electronic controller device is often referred to as a "service processor". The service processor operates to monitor and collect operating data (e.g., fan speed, processor utilization, temperature, etc.) of the device (IT or infrastructure) in which it is located, and makes the collected operating data available to other devices or systems for monitoring/management purposes. A typical implementation is a service processor located inside a server as an add-in card or embedded on the server motherboard. What is common to all of devices that include a service processor is that, for an operator to control the device and/or to perform functions with the equipment that the device is managing, the user has to authenticate herself/himself to the service processor of the device that he/she is attempting to communicate with. The authentication process enables the service processor to determine the user's (i.e., "client") role as well as the set of access privileges that are to be accorded to that particular user.

Also, common to all service processor devices is that they usually run a set of services which external users/clients can connect to. Services that are running on a service processor are designed for external clients to connect to via a network connection. Such services (e.g., an IPMI or REDFISH® protocol service) are listening on TCP or UDP ports and accepting incoming network connections. This scenario creates multiple challenges. For one, the service processor must maintain a database of user account information along with privileges for each user. Even though some service processors offer the use of external Directory Services for user authentication, a small set of so-called local user records still needs to remain inside the service processor. This is necessary to allow access to the service processor in case of outages of Directory Services or for first-time configuration of the service processor.

In order to allow an initial configuration of the service processor through a network, service processors usually come pre-configured with well-known default users that have full access permissions ("Administrator"-type users). The existence of such pre-configured users has proven to cause serious security breaches in the Data Center and Server industry. Default user information may become known to hackers that gain access to service processors before a legitimate configuration of the service processor through authorized personnel occurs. Moreover, server administrators may occasionally forget to change the default user configuration of a device's service processor, leaving the publicly known default user in place.

Maintaining a local user account database inside the service processor can be complex and error-prone. This arrangement also requires a significant amount of storage (flash memory), which adds to a server management solution cost. It also requires carefully planned disaster recovery strategies that address possible unplanned events, for example if the flash memory becomes corrupted and the stored user information is lost or invalid. Maintaining a local user account database inside the service processor also requires the use of complex software to be developed for the service processor to maintain a high degree of security. Such software may involve implementing secure password policies, password expiration dates, locking out users due to detected malicious activity, etc. All the above software requirements can exceed the capabilities of small, low cost service processors that the industry is presently striving to deploy in low-cost scalable data center designs.

Another important consideration is that when accessing network services that run on a service processor from external clients, such action typically requires the client to reside inside the entity's (i.e., the company's) firewall. Alternatively, if the client is outside the entity's firewall, then certain service ports need to be opened in the firewall to permit a connection with the service processor, which often times is not permitted by the entity's policies.

During first-time deployment of a service processor into an existing server management infrastructure system at a data center, the network IP address of the service processor needs to be known to the connecting clients. For example, a system administrator would need to know the IP address in order to type it into the web browser of a management console, which would bring up the service processor web user interface on the console's display. Setting up the initial IP address of a service processor can be a complex process, and often times needs to be manually performed by a data center worker. One way for setting up the initial IP address is by a user walking up to the device (e.g., server) that the service processor is installed in and running software utilities that allow configuring the service processor's IP address, or by using Dynamic Host Configuration Protocol (DHCP) to assign a dynamic IP address, in which case the assigned IP address needs to be discovered by other means.

All of the foregoing adds significantly to the complexity of installing and using service processors in present day data center applications. Conventional present day systems and methods for communicating with service processors by using a client to initiate the contact also give rise to significant security concerns. Such security concerns necessitate burdensome processes and procedures to be followed and updated by an entity to limit the threat of security breaches.

SUMMARY

This section provides a general summary of the disclosure, and is not a comprehensive disclosure of its full scope or all of its features.

In one aspect the present disclosure relates to a method for using a service processor to communicate with a remote component. The method may comprise using a service processor of a device to discover a remote component connected to the device by a network. Once the remote component is discovered, the method may then involve using the service processor to establish a communications channel, using the network, with the remote component, and then using the service processor of the device to authenticate the remote component.

In another aspect the present disclosure relates to a method for communicating with a service processor. The method may comprise using the service processor of a device to store a first identification certificate, and using the service processor of the device to discover a remote component connected to the device by a network. Once the remote component is discovered, the method may involve then using the service processor to establish a secure communications channel, using the network, with the remote component. The method may further include using the service processor of the device to authenticate the remote component using a second identification certificate, supplied over the secure communications channel, by the remote component. Subsequent to the service processor authenticating the remote component, then the method may include using the remote component to authenticate the device using the first identification certificate supplied by the device, over the secure communications channel, to the remote component.

In still another aspect the present disclosure is directed to a secure system for communications. The system may include a device having a service processor and a first memory for storing a first identification certificate, and a remote component having a processor and a second memory for storing a second identification component. A network may be included for connecting the device and the remote component. The service processor may further be configured to initiate discovery of the remote component and, when discovery of the remote component occurs, to authenticate the remote component using the second identification certificate supplied by the remote component to the device, and then to supply the first identification certificate to the remote component to enable the remote component to authenticate the device.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
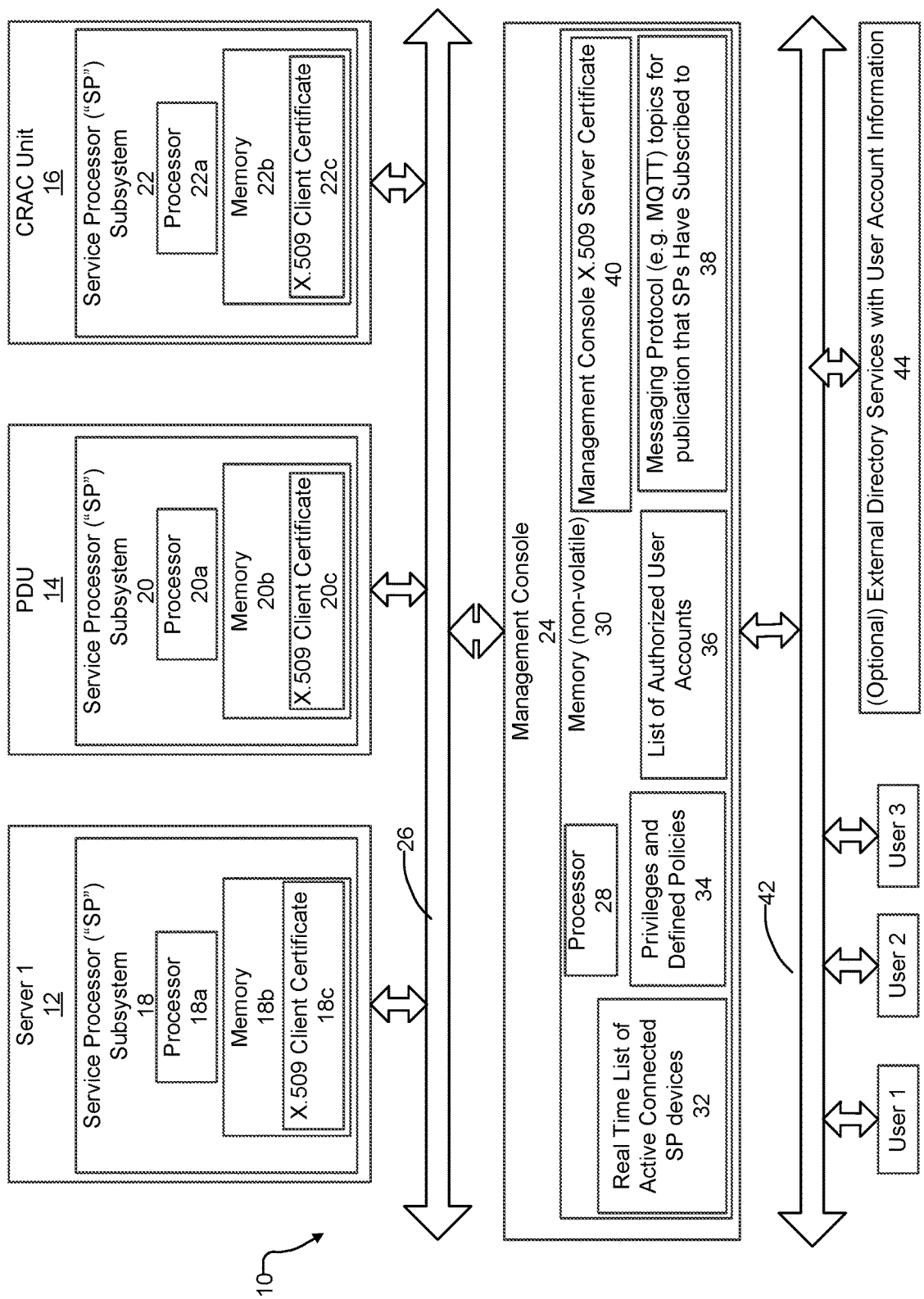
FIG. 1 is a high level block diagram of one embodiment of the present disclosure which shows three different types of data center devices with which the present system and method may be used.

The following description is merely exemplary in nature and is not intended to limit the present disclosure, application, or uses. It should be understood that throughout the drawings, corresponding reference numerals indicate like or corresponding parts and features.

The present disclosure involves a system and method which is a fundamental departure from present day arrangements for communicating with a service processor subsystem (hereinafter "SP subsystem"). Instead of the SP subsystem providing an accessible service, the system and method uses the SP subsystem to assume the role of a client and to initiate the connection with external services. This system and method results in a number of significant advantages that dramatically reduce the risk of security breaches that conventional SP subsystem communication systems suffer from. With the system and method of the present disclosure, essentially the SP subsystem of each device in the data center becomes an "Internet of Things" ("IoT") type device as seen emerging in other branches of industry, e.g., other IoT-controlled devices, like environmental sensors.

Referring to FIG. 1, one embodiment of a system 10 in accordance with the present disclosure is shown. The system 10 may be implemented using virtually any type of data center device that has its own SP subsystem. In this example a server 12, a PDU 14 and a CRAC unit 16 are shown being used with the system 10. Server 12 includes a SP subsystem 18, PDU 14 includes its own SP subsystem 20 and CRAG unit 16 likewise includes its own SP subsystem 22. The SP subsystem 18 includes a processor 18a, a non-volatile memory (RAM, ROM, etc.) 18b and a client certificate 18c which provides information on its identity and properties. SP subsystem 20 similarly includes a processor 20a, a non-volatile memory (RAM, ROM, etc.) 20b and its own client certificate 20c. Likewise, SP subsystem 22 includes a processor 22a, a non-volatile memory (RAM, ROM, etc.) 22b and its own client certificate 22c. In this example the client certificates may be X.509 client certificates, although the system 10 is not limited to use with only one type of identification certificate.

The system 10 further makes use of a management console 24 and bi-directionally communicates with the management console over a network 26. Network 26 may be a Local Area Network (LAN) such as a management network, a wide area network such the Internet, or virtually any other type of network. The management console 24 may optionally be formed by using a personal computing device of an individual, where the personal computing device is running suitable software for managing the communications with the SP subsystems 18-22, or could be a cloud service of similar or more capabilities.

The management console 24 may include its own processor 28 in communication with a non-volatile memory (RAM, ROM, etc.) 30. The memory 30 may be used to store/maintain different types of information such as a real time list of active, connected SP subsystem based devices 32, privileges and defined policies 34, one or more lists of authorized user accounts 36, a collection 38 of messaging protocol (e.g., Message Queue Telemetry Transport ("MQTT")) topics for publication that SP subsystems 18-22 have subscribed to, and a X.509 server certificate 40. A network 42, which may be different from the network 26 or may even be part of network 26, may be used by users to communicate with the management console 24 and ultimately with one or more of the SP subsystems 18-22. Optionally, an external directory services 44, which contains user account information, may be used by the management console 24 instead of the internally stored list of authorized user accounts 36.

Figure 2:
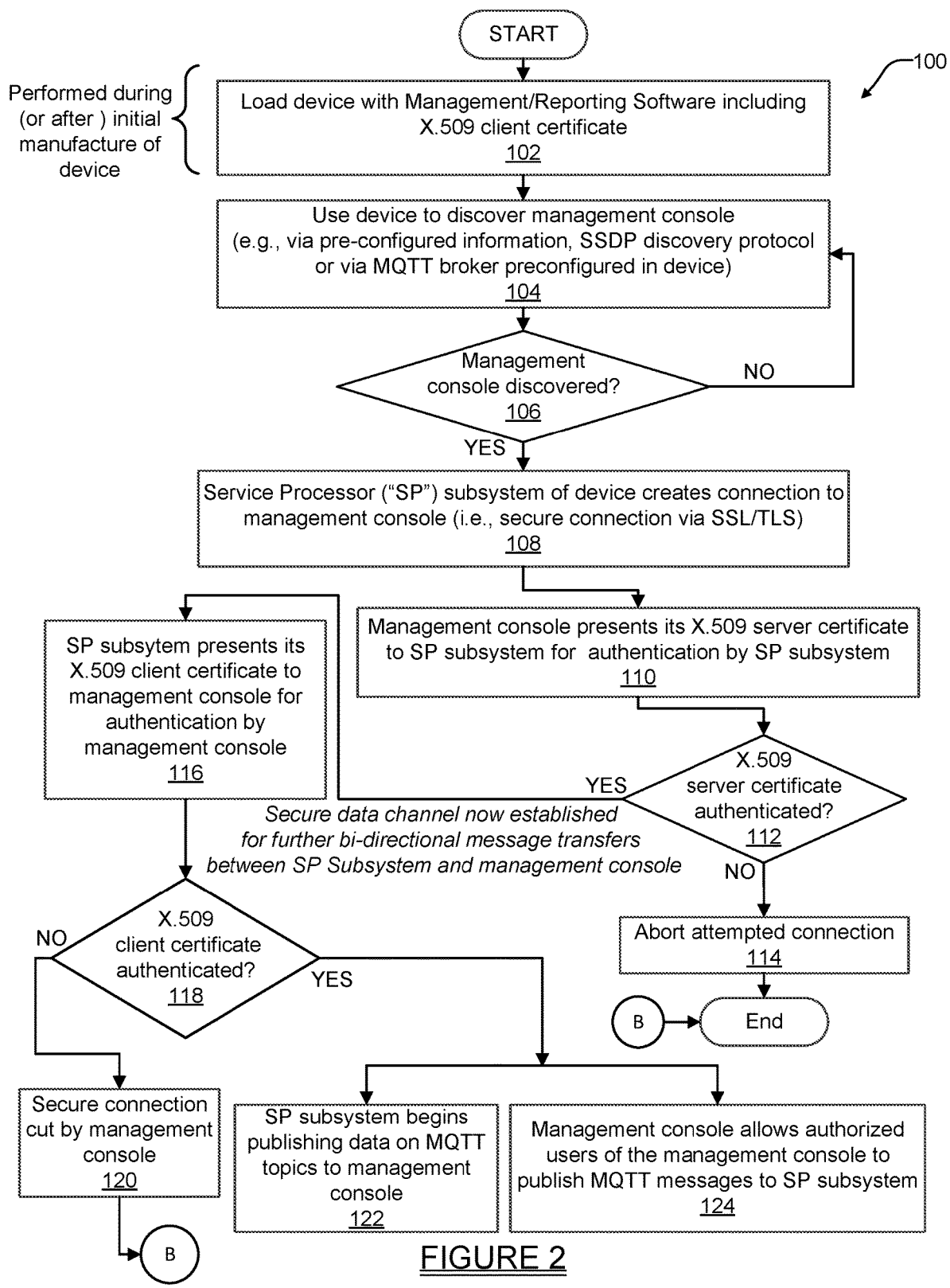
FIG. 2 is a flow chart illustrating various operations that may be performed by the system of FIG. 1 during typical operation.

Referring to FIG. 2, a flowchart 100 illustrating various operations that may be performed by the system 10 during typical operation is shown. At operation 102, which typically occurs during manufacture, assembly or the initial loading of operating system software onto the device, the device is loaded with SP management/reporting software. This software may be loaded into the device's non-volatile memory (e.g., flash memory attached to the SP) and starts running automatically when the device is powered up. For the purpose of the explanation the SP subsystem 18 of the server 12 will be referenced as the "device" that is communicating with the management console 24 in the following operations, although it will be appreciated that in practice, the same operations will be occurring for each one of the SP subsystems 18-22 of the devices 14 and 16.

At operation 104 the SP subsystem 18 begins attempting to discover the management console 24, for example by using SSDP (Simple Service Discovery Protocol) or by the MQTT messaging protocol, or any other suitable discovery process/protocol. A check is then made at operation 106 if the management console 24 has been discovered. If it has not, then operation 104 is repeated. If the check at operation 106 indicates that the management console 24 has been discovered, then at operation 108 the SP subsystem 18 of the server 12 creates a secure connection to the management console 24 (i.e., via SSL or TLS).

At operation 110 the management console 24 presents its X.509 server certificate to the SP subsystem 18 for authentication by the SP subsystem 18. If the SP subsystem 18 does not authenticate the X.509 server certificate at check 112, then the attempted connection is aborted as indicated at operation 114. If the authentication check at operation 112 is successful, then a secure data channel is established for further bi-directional message transfers between the SP subsystem 18 and the management console 24.

At operation 116, using the newly established secure data channel, the SP subsystem 18 then presents its X.509 client certificate to the management console 24 for authentication by the management console. At operation 118 a check is performed by the management console 24 to authenticate the identity of the SP subsystem 18. If this check is not successful, then the connection is cut by the management console 24 as indicated at operation 120. However, if the authentication at operation 118 is successful, the SP subsystem 18 may then begin publishing data on MQTT topics to the management console 24, as indicated at operation 122, while the management console allows authorized users of the management console 24 to begin publishing MQTT messages to the SP subsystem 18, as indicated at operation 124.

It will be appreciated then that the system 10 is especially valuable when used in data centers where many service processors or other controller devices need to be managed by a single instance. One such example is where a data center administrator is required to manage a large quantity (hundreds, thousands or more) of servers with SPs, PDUs, UPSs and other data center devices installed at the data center. Each management console 24 employed becomes an "IoT hub", while the SPs it communicates with become the IoT devices reporting their status via MQTT (a typical IoT device protocol) autonomously to their assigned management console.

The system 10 and method described herein may dramatically reduce the risk of security breaches that conventional SP communication systems suffer from by eliminating the need for the SP subsystems 18-22 to contain user account information and other sensitive information. The system 10 also significantly eases the burden on data center professionals in managing user account information, as this information is consolidated at the management console.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method for using a service processor of a data center device to communicate with a remote component, wherein the remote component has access to user account information and the service processor does not, comprising:
    using a service processor of a data center device to initially assume a role as a client and initiate a discovery operation to discover a remote component connected to the data center device by a network;
    once the remote component is discovered, then using the service processor to establish a communications channel, using the network, with the remote component;
    using the service processor of the data center device to initiate an operation to authenticate the remote component, and thereafter using the remote component to obtain information from the service processor; and
    wherein the account information is not held by the service processor during authentication of the remote component nor required by the service processor for communications with the remote component after the authentication of the remote component is complete.

2. The method of claim 1, wherein using the service processor to authenticate the remote component comprises using the service processor to receive an identification certificate over the communications channel from the remote component, and to use the identification certificate to make a determination that the remote component is to be authenticated.

3. The method of claim 1, further comprising:
    subsequent to the service processor authenticating the remote component, then using the remote component to authenticate the data center device using a stored identification certificate stored on the data center device, and supplied by the data center device, over the communications channel, to the remote component.

4. The method of claim 1, wherein establishing a communications channel with the remote component comprises establishing a secure communications channel with the remote component.

5. The method of claim 4, wherein establishing a secure communications channel comprises establishing a Secure Sockets Layer connection.

6. The method of claim 4, wherein establishing a secure communications channel comprises establishing a Transport Layer Security connection.

7. The method of claim 1, wherein when the authentication of the remote component by the data center device is unsuccessful, then aborting communications between the remote component and the data center device.

8. The method of claim 3, wherein using a stored identification certificate comprises using the service processor of the data center device to store an X.509 certificate.

9. The method of claim 2, wherein using the service processor to receive an identification certificate from the remote component comprises using the service processor to receive an X.509 certificate from the remote component.

10. The method of claim 1, wherein using the service processor of the data center device to discover a remote component comprises using the service processor of the data center device to discover a management console.

11. The method of claim 2, wherein using the service processor to receive an identification certificate over the communications channel from the remote component comprises using the service processor to receive an identification certificate stored in a non-volatile memory of a management console.

12. The method of claim 1, wherein using the service processor of the data center device to discover a remote component comprises having the data center device using a Simple Service Discovery Protocol (SSDP) to discover the remote component.

13. The method of claim 1, wherein using the service processor of the data center device to discover a remote component comprises having the data center device use a Message Queing Telemetry Transport (MQTT) messaging protocol.

14. The method of claim 1, further comprising:
once the service processor of the data center device has authenticated the remote component, then using the service processor to begin publishing data to the remote component using a selected messaging protocol.

15. The method of claim 1, further comprising:
once the service processor of the data center device has authenticated the remote component, then using the remote component to publish data to the service processor using a selected messaging protocol.

16. A method for communicating with a service processor of a data center device, comprising:
using the service processor of the data center device to store a first identification certificate;
using the service processor of the data center device to initially assume a role as a client and to initiate a discovery operation to discover a remote component connected to the data center device by a network, wherein the remote component has access to user account information and the service processor does not;
once the remote component is discovered, then using the service processor to establish a secure communications channel, using the network, with the remote component;

using the service processor of the data center device to authenticate the remote component using a second identification certificate, supplied over the secure communications channel, by the remote component;
subsequent to the service processor authenticating the remote component, then using the remote component to authenticate the data center device using the first identification certificate supplied by the data center device, over the secure communications channel, to the remote component, and using the data center device to bidirectionally communicate with the remote component; and
wherein the account information is not held by the service processor during the authentication of the remote component nor required by the service processor for continuing communications with the remote component after the authentication is complete.

17. The method of claim 16, wherein at least one of the first and second identification certificates comprises an X.509 certificate.

18. A secure system for communications, comprising:
a data center device having a service processor and a first memory for storing a first identification certificate;
a remote component having a processor and a second memory for storing a second identification certificate, the remote component configured to obtain information from the data center device and configured to access user account information;
a network for connecting the data center device and the remote component;
the service processor further being configured:
to act as a client to initiate a discovery operation to discover the remote component;
when discovery of the remote component occurs, to authenticate the remote component using the second identification certificate supplied by the remote component to the data center device;
to supply the first identification certificate to the remote component to enable the remote component to authenticate the data center device; and
to thereafter continue acting as the client to obtain information from the remote component, and without requiring the user account information to be accessed by the service processor during the authentication of the remote component or for continuing communications with the remote component after the authentication of the remote component is complete.

19. The system of claim 18, wherein the first identification certificate comprises an X.509 certificate.

20. The system of claim 18, wherein the second identification certificate comprises an X.509 certificate.

* * * * *